No. 644,720. Patented Mar. 6, 1900.
W. NORTHORPE.
AUTOMATIC VENDING AND INDICATING APPARATUS.
(Application filed July 5, 1899.)
(No Model.) 4 Sheets—Sheet 1.

WITNESSES:
Ella L. Giles
Oldrumk

INVENTOR
William Northorpe
BY
Richardson
ATTORNEYS

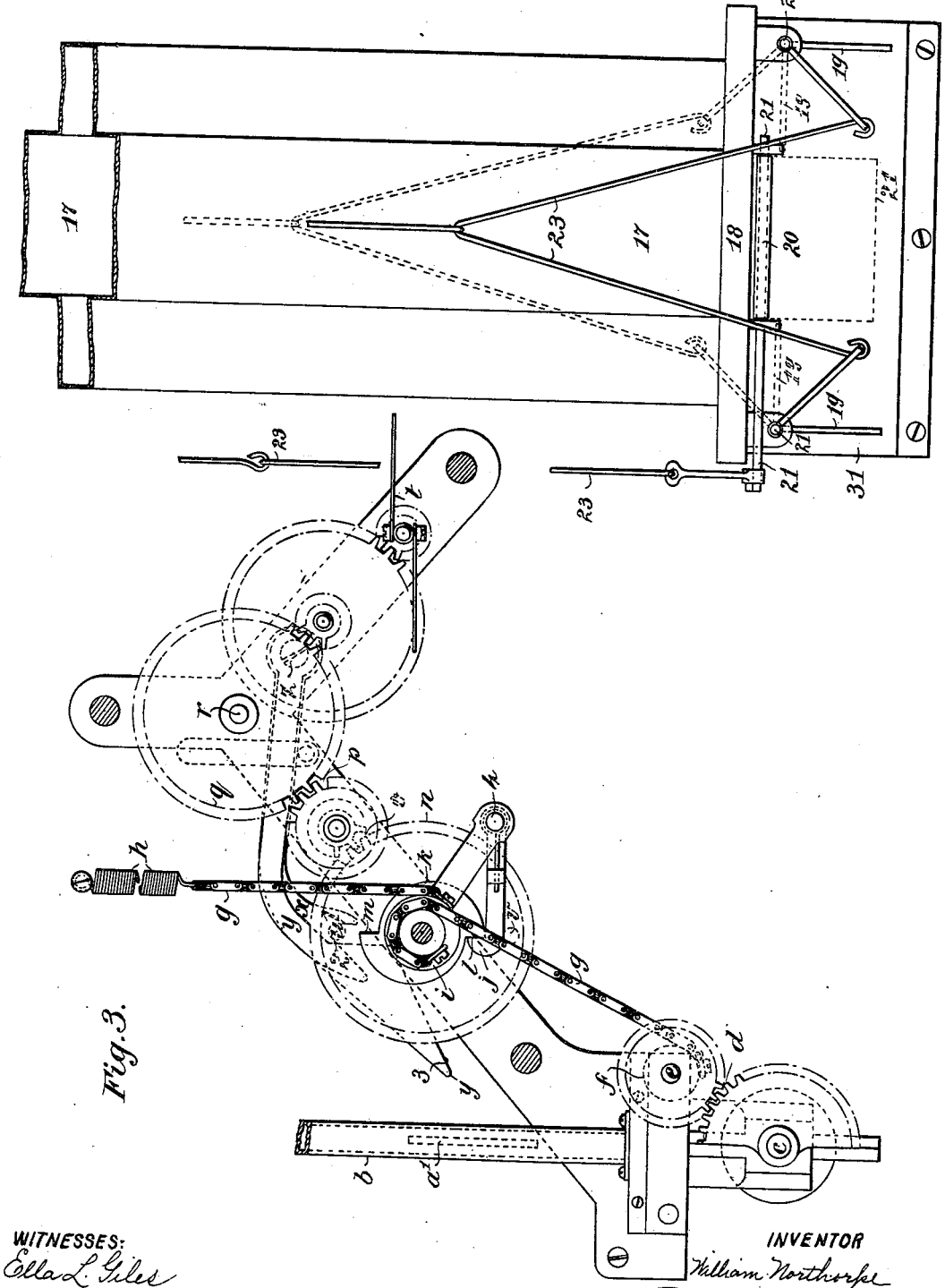

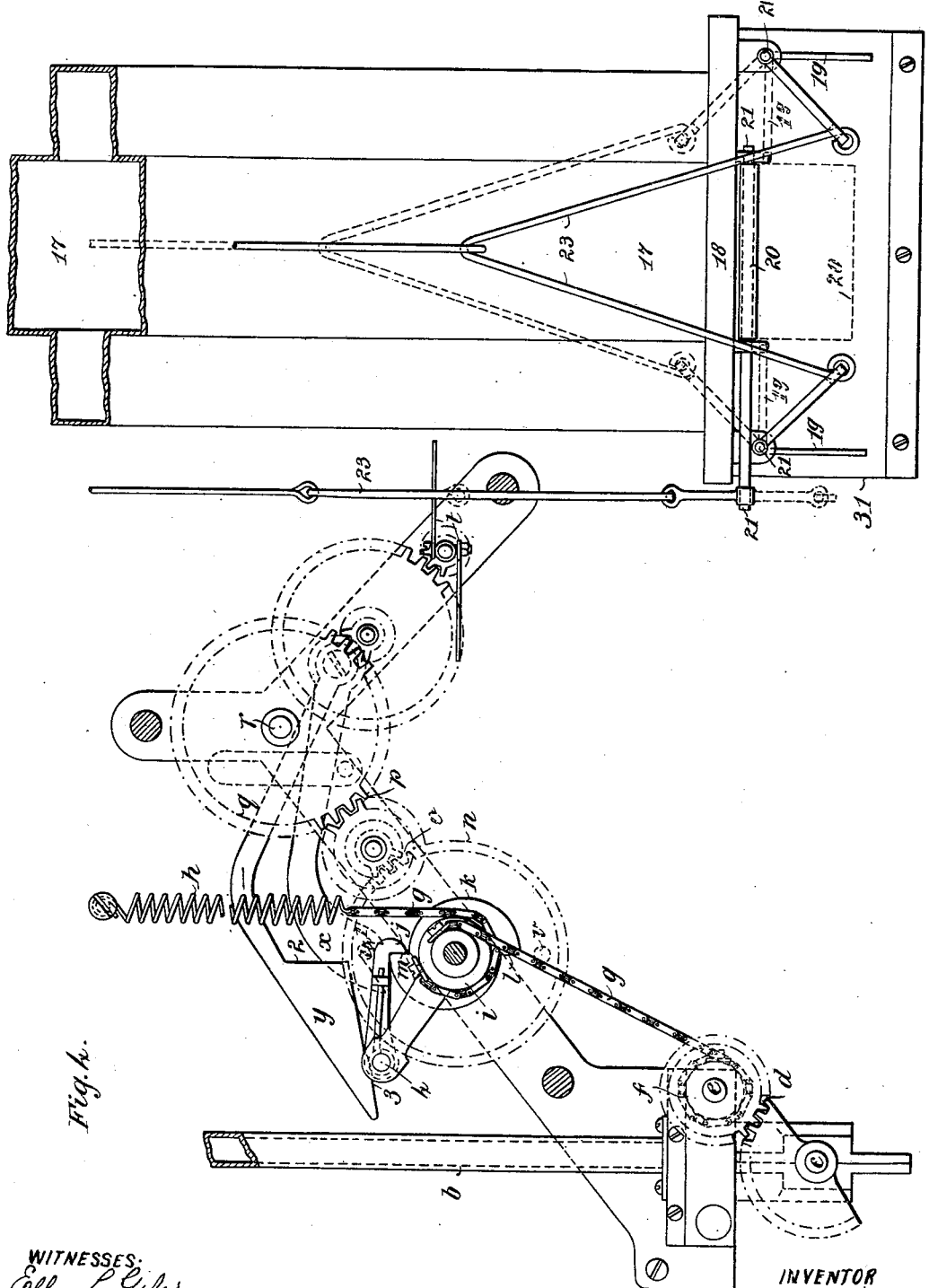

No. 644,720. Patented Mar. 6, 1900.
W. NORTHORPE.
AUTOMATIC VENDING AND INDICATING APPARATUS.
(Application filed July 5, 1899.)

(No Model.) 4 Sheets—Sheet 4.

WITNESSES:
Ella L. Giles

INVENTOR
William Northorpe
BY
ATTORNEYS

UNITED STATES PATENT OFFICE.

WILLIAM NORTHORPE, OF LONDON, ENGLAND, ASSIGNOR TO FRANK WILLIAM OGDEN SMITH, OF SAME PLACE.

AUTOMATIC VENDING AND INDICATING APPARATUS.

SPECIFICATION forming part of Letters Patent No. 644,720, dated March 6, 1900.

Application filed July 5, 1899. Serial No. 722,855. (No model.)

*To all whom it may concern:*

Be it known that I, WILLIAM NORTHORPE, a subject of the Queen of Great Britain and Ireland, and a resident of 2ᵃ Clerkenwell Close, London, England, have invented certain new and useful Improvements in Automatic Vending and Indicating Apparatus, (for which I have made application in Great Britain, No. 7,799, dated April 13, 1899,) of which the following is a specification.

My invention relates to automatic vending or goods-delivery apparatus adapted at the same time by an indicator to afford amusement as an oracle or fortune-teller.

It is the object of my invention to provide such an apparatus adapted to deliver a series of packets or other goods in predetermined rotation and at the same time to indicate by a hand or pointer the description of the article being delivered to the operator, such pointer being apparently revolved haphazard, but in reality controlled by a train of wheels so arranged that although the pointers make a part revolution or one or more complete revolutions and a part it by an eccentric number of stoppages stops once opposite each of a series of descriptions displayed upon the dial before it points to the same one a second time.

I will describe my invention by reference to the accompanying drawings, in which—

Figure 1:
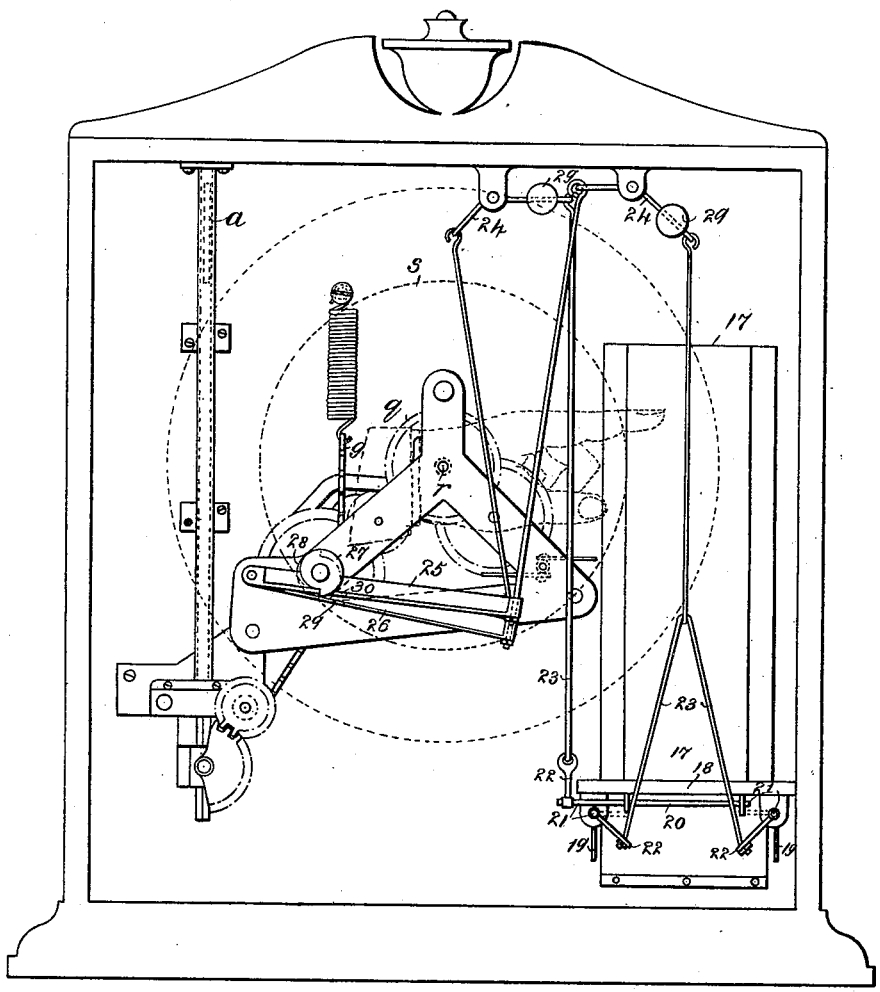
Figure 2:
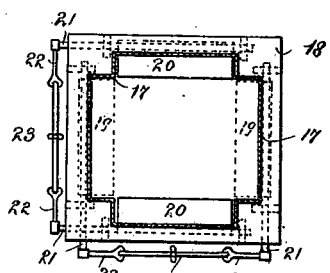
Figure 5:
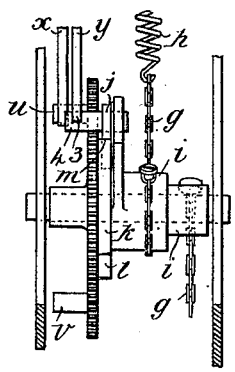

Figure 1 is a back elevation of the complete apparatus, and Fig. 2 is a plan of the delivery mechanism forming part of the same. Figs. 3 and 4 are elevations of the indicator mechanism, respectively, in normal position and when wound up by the operator. Fig. 5 is a side view of part of the winding mechanism, and Fig. 6 is a side view of one form of coin-locking device and handle for operating same.

According to my invention the indicating mechanism consists of a spring-operated train of wheels, such as hereinafter described, adapted to be wound up by the operator when a coin has been inserted. Any of the well-known coin-locks or similar devices may be employed for securing connection between the operating-handle and the winding-spindle of the indicator mechanism.

Figure 6:
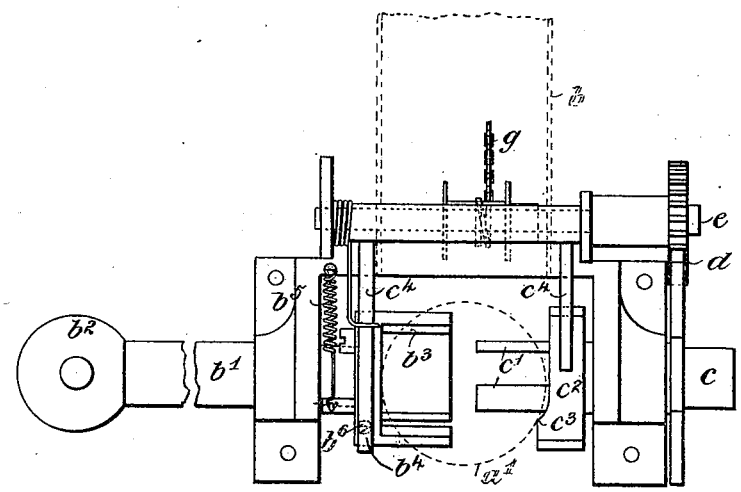

In the coin-locking device illustrated in Fig. 6 the coin $a'$ inserted in slot $a$, passing down a suitably-arranged chute $b$, serves to connect the spindle $b'$ of the external operating-handle $b^2$ to the winding-spindle $c$ by means of suitable slots $b^3 c'$, or pins cut in or affixed to the adjacent faces of the disks $b^4 c^2$, formed on the ends of said spindles, the coin $a'$ resting upon a projection $c^3$ at the base of the disk $c^2$. After revolution of the handle $b^2$, and together with it the disks $b^4$ and $c^2$ and coin $a'$, the said disk $c^2$ is retained by a spring-catch $c^4$, while the disk $b^4$ is returned to normal position by a spring $b^5$. The coin being now no longer held up by the projection $c^3$ falls into any convenient receptacle. During the return revolution of the handle $b^2$ and disk $b^4$ a projection $b^6$ upon the latter engages with and releases the spring-catch $c^4$, which extends across the gap between the parts $c^2 b^4$ for that purpose, and thus the part $c^2$ is freed, allowing the mainspring of the indicating mechanism to act, as will be hereinafter fully explained.

The rotation of the winding-spindle $c$ by the external handle when the coin is inserted serves to wind up the spring-operated indicating and delivery mechanism by rotating through suitable gearing $d$ a second and adjacently-arranged spindle $e$, which has an arm or lever or a drum $f$, to which is connected a chain or cord $g$ under tension of a spring $h$. This chain in passing from the said drum $f$ to the spring $h$ is coiled once or twice round and fixed to a loose sleeve or drum $i$ in such manner that when operated by the external handle to wind up the spring the said sleeve $i$ is rotated, together with a spring-pressed pawl $j$, which rides over a ratchet-wheel $k$, having two teeth $l m$, the pawl $j$ engaging each tooth alternately, so that on release of the spring the wheel $n$, which is the first of a train of wheels to which the ratchet-wheel is attached, makes a half-revolution at each operation. This wheel $n$ drives through intermediate gearing, such as $o$, $p$, and $q$, the spindle $r$, carrying the indicator or pointer. The proportion of this gearing is so arranged that the pointer or spindle $r$ shall in successive operations point to each description in the series depicted on the dial in predetermined rotation, but in an eccentric manner, before again passing to the first of the series. For instance, assuming there is a series of fifty-three goods or packets to be delivered, the pointer-dial $s$ (shown dotted in Fig. 1) will be provided with fifty-three divisions and corresponding descriptions, and the pointer will be rotated one complete revolution, and, say, twenty-four of the fifty-three divisions at each operation, passing through the whole of the series before again passing to the first. To effect this, the wheel $n$ will have fifty-six teeth, the second intermediate wheel $o$ eight teeth, and the one $p$ on the same spindle as $o$ twenty-two teeth, the latter gearing with the wheel $q$ on the indicator-spindle $r$ having fifty-three teeth.

To secure a steady movement of the pointer, a suitable fly-brake, such as $t$, is or may be added to the train of wheels.

In order to secure accurate movement at each operation, one of the wheels in the train is provided with a locking and releasing device. For instance, it may be applied to the wheel $n$ and consist of two oppositely-disposed stops $u$ $v$ thereon and suitably-disposed locking-levers $x$ $y$, centered at $z$ and engaging the uppermost stop $u$. The lever $x$ has a notch 1, preventing backward movement, and the other, $y$, has a notch 2, locking the forward movement. The lever $y$ has a part 3 extending in the path of the arm 4, which carries the driving-pawl $j$, so that as the spring is wound up the lever $y$ is raised by the pawl-carrying arm 4 out of engagement with the uppermost stop $u$ and allows the spring $h$ on release to turn the wheel $n$ a half-revolution.

The goods-delivery mechanism coacting with the above-described indicating mechanism may be of any suitable kind or of the kind hereinafter described, which is especially adapted for the purpose, but for which I do not make a claim as far as the use of alternately-operated hinged flaps is concerned.

The delivery mechanism shown in Figs. 1 to 4 is one for use particularly when the goods or cards are thin and of oblong shape. It comprises a vertical hopper or container 17, whose exit and cross-sectional form is somewhat in the form of a federal cross, (shown clearly in Fig. 2,) fixed to a bed-plate 18 and adapted to contain goods of an oblong shape arranged alternately crosswise, so that the greatest length of each is at right angles to the one immediately beneath, the delivery being effected by four hinged flaps 19 19 20 20, each opposite pair, such as 19 19 or 20 20, acting together, alternately rising and falling under the column of goods, so that the lowermost article is released, while the projecting ends of the next above are supported by the other pair of flaps. These flaps are mounted upon suitable hinge-pins 21, having operating-levers 22. In order that these flaps may coact with the indicating mechanism, their levers 22 are suitably connected, such as by cords or wires 23 and bell-crank levers 24 to a pair of arms or levers 25 26, mounted adjacent to and under the control of the indicator mechanism, and adapted to be depressed and released by two oppositely-disposed snail-shaped cams 27 28, mounted on the spindle of the first wheel $n$ of the train or otherwise receiving a definite motion therefrom. When the wheel $n$ receives a half-revolution at each operation, the noses of these cams are arranged oppositely, so that at one operation of the indicating mechanism the lever 25, released at the previous operation, as shown in Fig. 1, is depressed level with the other, 26, by one cam 27 and its corresponding pair of flaps 19 19 raised to support the next article in the container. Then both pairs of flaps 19 and 20 being in their raised position and both cam-levers 25 and 26 depressed, the nose of the other cam 28 passes into a notch or cut-away part 29 in the lever 26, releasing the latter and its corresponding flaps 20 20, which open, assisted by counterweights, such as 29, suitably disposed upon the bell-crank levers 24 or otherwise, to release and deliver the lowermost article which will pass down a chute 31 to the operator. At the next operation the other lever 26 will be depressed and its corresponding flaps 20 20 raised, the other cam 27 and notch 30 acting to release the lever 25 previously depressed and its corresponding flaps 19 19 to deliver, as described, and so on alternately.

From the above description it will be seen that in operation as soon as a coin has been inserted the operator is enabled to wind up the spring $h$ for operating the mechanism, and on release of the handle $b^2$ or by falling out of the coin, as described, the train of wheels is operated by the spring and the pointer rotated apparently haphazard, but in reality in a predetermined manner, by the gearing described and stops at a given description on the dial $s$. Simultaneously with this action, through the cams 27 and 28 and levers 25 and 26 described, the delivery mechanism is operated and one of the series of articles delivered corresponding to the description on the dial at which the pointer stops.

Having now described my invention, what I claim as new, and desire to secure by Letters Patent, is—

1. The improved coin-freed apparatus comprising the combination with a goods-delivery mechanism, of a coacting indicating mechanism having operating connections with said goods-delivery mechanism and having a spring-operated train of wheels adapted to be wound by the operator through the medium of an inserted coin and on release to eccentrically rotate a pointer a predetermined distance to indicate the next article to be delivered out of a series and simultaneously therewith to operate the said delivery mechanism to deliver any article corresponding to that indicated by the pointer, substantially as described.

2. The improvement in coin-freed apparatus comprising the combination with a goods-delivery mechanism, of a coacting indicating mechanism having operating connections with said goods-delivery mechanism and having a winding-spindle adapted to impart a half-revolution to the first wheel of a spring-operated train of wheels driving the pointer, the stops on said first wheel and the locking-levers $x$ and $y$, all arranged and adapted to operate substantially as described.

3. The improvements in coin-freed apparatus comprising the combination with a goods-delivery mechanism of the kind described, of an indicating mechanism having a spring-operated train of wheels adapted to be wound up by the operator through the medium of the inserted coin, and on release to eccentrically rotate a pointer a predetermined distance to indicate the next article to be delivered out of a series, and simultaneously therewith by means of a pair of oppositely-disposed cams 27, 28 and levers 25, 26 to operate and release the flaps of the delivery mechanism so as to deliver an article corresponding with that indicated by the pointer, substantially as described.

In witness whereof I have hereunto signed my name in the presence of two subscribing witnesses.

WILLIAM NORTHORPE.

Witnesses:
   ALFRED E. GRAY,
   ALFRED B. CAMPBELL.